United States Patent [19]

Werner

[11] Patent Number: 4,976,783

[45] Date of Patent: Dec. 11, 1990

[54] MODIFIED CYCLOPENTADIENE RESIN, PROCESSES FOR ITS PREPARATION, AND ITS USE

[75] Inventor: Gerhard Werner, Glashütten/Taunus, Fed. Rep. of Germany

[73] Assignee: Hoechst AG, Fed. Rep. of Germany

[21] Appl. No.: 276,891

[22] Filed: Nov. 28, 1988

Related U.S. Application Data

[63] Continuation of Ser. No. 902,300, Sep. 29, 1986, abandoned.

[30] Foreign Application Priority Data

Aug. 31, 1985 [DE] Fed. Rep. of Germany ....... 3531242

[51] Int. Cl.$^5$ .......................... C09D 11/00; C08L 6/00
[52] U.S. Cl. ..................................... 106/20; 525/134; 525/391; 525/392; 525/368; 528/129
[58] Field of Search ............................ 106/20, 27, 28; 525/134, 391, 392, 368; 528/201.5, 202, 205, 129; 524/124, 432, 433

[56] References Cited

U.S. PATENT DOCUMENTS

| | | | |
|---|---|---|---|
| 4,205,145 | 5/1980 | Tsuchiya et al. | 525/502 |
| 4,401,791 | 8/1983 | Hultzsch et al. | 525/132 |
| 4,506,059 | 3/1985 | Hultzsch | 525/134 |

FOREIGN PATENT DOCUMENTS 56-95962  8/1981  Japan .

Primary Examiner—Peter F. Kulkosky
Attorney, Agent, or Firm—Bierman and Muserlian

[57] ABSTRACT

A modified cyclopentadiene resin which comprises (a) 40 to 90% by weight of units of monomeric or oligomeric cyclopentadiene and/or its alkyl-substitution products, (b) 1 to 30% by weight of resols, (c) 5 to 40% by weight of non-aromatic, unsaturated monocarboxylic acids having 8 to 26 carbon atoms, (d) 0 to 10% by weight of α,β-olefinic, unsaturated dicarboxylic acid units, (e) 0 to 20% by weight of other copolymerizable monomers and/or (f) 0 to 3% by weight of a metal compound from the groups IIa, IIb or IIIa of the periodic system, the sum of the components (a) to (f) always being 100% by weight, a single-stage process for its preparation, and the use of the modified cyclopentadiene resins as binders for printing inks, particularly for gravure inks.

15 Claims, No Drawings

MODIFIED CYCLOPENTADIENE RESIN, PROCESSES FOR ITS PREPARATION, AND ITS USE

This is a continuation of Ser. No. 902,300 filed Aug. 29, 1986 now abandoned.

It is known that cyclopentadiene or its polymers can be reacted in tall oil at elevated temperature and the product thus obtained can be esterified using a polyhydric alcohol (U.S. Pat. No. 2,598,424). These products are employed for the preparation of surface coatings. However, the use in printing inks is not mentioned in this publication.

Other publications mention reactions of (di)cyclopentadiene resins with phenol formaldehyde resins, unsaturated carboxylic acids, olefinic unsaturated hydrocarbons and/or oils to form resins which are used in the printing industry. These processes are multistage processes in order to obtain the products desired.

Thus, for example, German Auslegeschrift No. 2,246,283 describes the reaction of a hydrocarbon resin, prepared by polymerization, from cyclopentadiene, methylcyclopentadiene, or their polymers, and, if appropriate, other unsaturated hydrocarbons with unsaturated fatty acids, for example tall oil fatty acid, in the presence of metal salts and, if appropriate, phenols, for example in the form of a substituted phenol, resol or the corresponding benzyl ether compound. However, it is possible, in the case of this reaction, that the phenol components are not incorporated uniformly or, in many cases, not quantitatively, so that an inhomogeneous product may be produced. In addition, the reaction components can be combined with polymers and give different products as is the case, for example, in a one-pot process.

A further publication (German Offenlegungsschrift 2,414,558) describes the preparation of a thermoplastic resin, containing polar groups and unsaturated bonds for use in printing inks, from a three-component mixture comprising a five-membered ring compound which contains unsaturated conjugated double bonds, a mono- or polyunsaturated carboxylic acid having 3 to 22 carbon atoms, or its anhydride, and a monohydric, saturated or unsaturated alcohol. This resin can be modified, after its preparation, using a phenol formaldehyde condensation product. As typical examples of the carboxylic acid components employed mention is made of acrylic acid, methacrylic acid, maleic acid, its anhydride, tetrahydrophthalic acid and its anhydride, fumaric acid, citraconic acid, itaconic acid, or mixtures thereof.

The use of fatty acids for these reaction components is thus not mentioned. However, it is stated elsewhere that the resin obtained can as is the case with phenolic resins, also be modified using a mixture of a polyhydric alcohol and a fatty acid and/or fats and oils. The composition of these resins and the procedure for their preparation can thus not be compared with the present invention.

It is furthermore known (U.S. Pat. No. 4,433,100) that synthetic resins for printing ink mixtures can be prepared by reacting a predominant proportion of dicyclopentadiene with smaller proportions of at least one unsaturated hydrocarbon, at least one compound which contains a fatty acid or a natural resin acid, and, if appropriate, at least one ethylenic, unsaturated, lower aliphatic dicarboxylic acid. However, the products obtained do not meet all the demands which are placed on them. The linseed oil compatibility, in particular, is clearly inferior. Although this can be improved by increased use of maleic anhydride, the mineral oil compatibility then worsens in this case.

The object was therefore to overcome the difficulties of the known products or of the known processes and to make new resins available which do not have these disadvantages.

The invention relates to a modified cyclopentadiene resin which comprises (a) 40 to 90% by weight of units of monomeric or oligomeric cyclopentadiene and/or its alkyl-substitution products, (b) 1 to 30% by weight of resols, (c) 5 to 40% by weight of non-aromatic, unsaturated monocarboxylic acids having 8 to 26 carbon atoms, (d) 0 to 10% by weight of $\alpha,\beta$-olefinic, unsaturated dicarboxylic acid units, (e) 0 to 20% by weight of other copolymerizable monomers and/or (f) 0 to 3% by weight of a metal compound from the groups IIa, IIb or IIIa of the periodic system, the sum of the components (a) to (f) always being 100% by weight.

The invention also covers a process for the preparation of a modified cyclopentadiene resin, in which process the components (a) to (f) are reacted at a temperature of 230 to 300, preferably 255° to 280° C. This process has the advantage that homo- or copolymerization of the component (a) is not carried out beforehand, but instead, the polymerization can occur simultaneously with the incorporation of the modified components (b) to (e), whereby not only a significant amount of work and energy is saved as a result of the one-pot process, but also, surprisingly, excellent product properties are obtained. In general, the reaction proceeds within 1 to 2 hours at the abovementioned reaction temperatures, but can also, under certain circumstances, take several hours, for example up to 24 hours. In the case of this reaction, the heat of polymerization evolved can advantageously be used for the continuation of the reaction. The component (a) is expediently incorporated into the reaction product in a proportion of at least 40, preferably at least 55, particularly 55-80, % by weight.

The proportion of the resol (b) is, in general, 1 to 30, preferably 3 to 10, % by weight and that of the component (c) is, in general, 5 to 40, preferably 10 to 25, % by weight.

The preferred range of unsaturated dicarboxylic acid units (d) is 0.5 to .5, particularly 0.5 to 3, % by weight in the case of resins for offset printing, but 5–10% by weight in the case of resins for gravure printing.

The component (e) is employed in the preferred range from 3 to 7% by weight.

The metal compound (f) has a preferred range from 0.5 to 1.5% by weight.

The percentages mentioned always relate to the sum of the components (a) to (f), which is always 100% by weight. If desired, the melting point, the compatibility and the viscosity of the final product can be matched to the application desired by varying the component proportions.

Suitable cyclopentadiene compounds (a) are, for example, cyclopentadiene, methylcyclopentadiene and their oligomers, such as di- and tricyclopentadiene, dimethylcyclopentadiene, and methyl- and dimethyldicyclopentadiene, in each case individually or mixed, furthermore technicalgrade dicyclopentadiene containing at least 60, preferably 70, % by weight of dicyclopentadiene and other unsaturated hydrocarbons of the $C_4$ and $C_5$ fraction contained therein, which are, in general, present as dimers, for example dimers of cyclopentadiene or methylcyclopentadiene with isoprene, piperylene and/or butadiene.

In general here, the starting hydrocarbons to be polymerized are selected so that the proportion of cyclopentadiene compounds forms at least 50, preferably at least 70% by weight of the hydrocarbon monomers.

The resol component (b) represents a condensation product of a phenol and formaldehyde and is designated precondensate. In general, the precondensate is prepared by reaction of a phenol with formaldehyde in the presence of an alkaline catalyst, for example a hydroxide of sodium, potassium, barium, magnesium or calcium, at a temperature from 50° to 100° C. within 3 to 5 hours. The precondensate thus prepared contains, in general, mainly dimethylolphenol, its oligomers, and more highly condensed resols. In some cases, it additionally contains (alkyl)methylolhydroxybenzyl ethers. Phenol, the various cresols, butylphenol, amylphenol, octylphenyl, phenylphenol and bisphenols, for example, can be used as phenol, the p-alkylphenols, such as p-t-butylphenol, p-t-amylphenol or p-octylphenol, and nonylphenol being preferably employed.

Higher fatty acids having 8 to 26 carbon atoms, or their dimers, for example soya or linseed oil fatty acid, for example, but preferably tall oil fatty acid and/or natural resin acids, for example colophonium or tall resins, in each case individually or in mixtures, are suitable as fatty acid component (c), which can be mono- or polyunsaturated.

The component (d) is employed, in general, in the form of maleic acid or its anhydride. However, it is also possible to use other polycarboxylic acid units, such as fumaric acid, itaconic acid, mesaconic acid, citraconic acid, 1,2-tetrahydrophthalic acid and/or their anhydrides, if these exist, in each case individually or mixed.

Suitable copolymerizable monomers (e) are, for example, styrene, α-methylstyrene, the various vinyltoluenes, and esters of acrylic or methacrylic acid, such as methyl (meth)acrylate, butyl (meth)acrylate and octyl (meth)acrylate. In addition, vinyl compounds, for example vinyl esters such as vinyl acetate, or vinyl ethers, are suitable. Dicyclopentadiene is employed as component (a) and styrene as component (e) according to a preferred embodiment.

As metal compounds (f), compounds of metals from the groups IIa, IIb and IIIa of the periodic system are used, which compounds are not strongly colored and do not produce strongly colored products in combination with petroleum resin and unsaturated fatty acids. Metal oxides or metal carboxylates are preferred. The carbonic acids from which the metal salt is derived can be, for example, saturated or unsaturated fatty acids. Suitable metal compounds are, inter alia, oxides and hydroxides, of magnesium, calcium, zinc and aluminum, and also their salts, such as calcium acetate, zinc acetate, aluminum oleate, magnesium stearate and magnesium oleate.

Although the process can be carried out continuously, it is advisable, for economic reasons, to carry out the polymerization, the incorporation of the unsaturated dicarboxylic acid unit and the phenol component in one stage. This reaction proceeds, in general, very smoothly, products being obtained with excellent yields. However, in some cases it can also be desirable to allow the components (a) to (f) to react in a one-pot process and subsequently to add and react further small amounts of individual components in order to adjust the desired properties and characteristics more accurately. These also include, for example, polyhydroxyalcohols, such as ethylene glycol, diethylene glycol, propylene glycol, neopentyl glycol, glycerol, trimethylolethane, trimethylolpropane, pentaerythritol and dipentaerythritol, and, particularly preferably, tri- and higher hydroxyalcohols. The polyhydroxyalcohol can, of course, also be used in the form of a mixture. This one-pot reaction can be carried out, for example, under increased pressure and the further reaction under atmospheric pressure, if appropriate. Preferably, however, the single-stage reaction is carried out.

The reaction products according to the invention can have a molecular weight from 600 to 5,000, preferably from 800 to 2,000. The melting points can be between 50° and 250°, preferably 90° and 150° C.

The products according to the invention have good compatibility with alkyd resins and with solvents such as mineral oils and drying oils. Their excellent storage stability, which can be several months, is particularly surprising. The products also have advantages in their printing properties.

Because of the good printing properties, the cyclopentadiene resin according to the invention can be used as a binder for printing inks, particularly for offset printing, and above all for rotary offset printing and gravure printing. The high gloss, the rapid drying, the rapid solvent release and the good gelling with aluminum compounds stand out here as particularly favorable properties.

In the Examples and Tables which follow, P in each case represents parts by weight and % in each case represents per cent by weight.

EXAMPLES 1–14

The components (a) to (f) listed in Table 1 and corresponding to the individual examples were initially introduced, in the stated amount ratios under inert gas into a stirred autoclave. The contents were subsequently heated to 275° C. and the mixture maintained at this temperature for 8 hours. The excess pressure produced was then reduced to atmospheric pressure, low-boiling components simultaneously distilling off, and the autoclave contents cooled to room temperature. In general, the yield is above 90%. The characteristics of the resins produced according to Examples 1 to 14 can be seen from Table 1a which follows.

Notes on Table 1a

The mineral oil compatibility is determined by dissolving the substance in a mineral oil designated "PKWF 4/7" manufactured by J. Haltermann, Hamburg. The linseed oil takeup in per cent by weight which is displayed by a 50% strength solution in "PKWF 4/7" until the onset of cloudiness indicates the linseed oil compatibility.

The thermal stability was determined by storing the examples tested for six hours at 230° C. under a nitrogen atmosphere. The viscosities were measured, in each case in 50% strength toluene solution, before and after storage for 6 hours.

TABLE 1

| Example | a DCPD(80% strength) | b Phenol resins | c Natural resin acids Fatty acids | d MAA dicarboxylic acid | e Comonomers | f Salts |
|---|---|---|---|---|---|---|
| 1 | 65 P | 5 P t.-butyl-phenolresol | 24 P tall oil fatty acid | 2 P | 5 P styrene | — |
| 2 | 66.5 | 5 P t.-butyl-phenolresol | 23 tall resin | — | 5 P styrene | 0.5 P MgO |
| 3 | 65 | 5 P t.-butyl-phenolresol | 25 tall resin | — | 5 styrene | — |
| 4 | 64 | 5 P t.-butyl-phenolresol | 25 tall resin | 1 | 5 styrene | — |
| 5 | 64 | 5 P t.-butyl-phenolresol | 25 colophonium | 1 | 5 styrene | — |
| 6 | 55 | 5 P t.-butyl-phenolresol | 35 colophonium | 2 | 3 styrene | — |
| 7 | 48 | 5 P t.-butyl-phenolresol | 45 colophonium | 2 | — | — |
| 8 | 64 | 9 P t.-butyl-phenolresol | 13 tall oil fatty acid | 2 | 12 styrene | — |
| 9 | 64 | 5 P t.-butyl-phenolresol | 25 tall oil fatty acid | 1 | 5 vinyl acetate | — |
| 10 | 64 | 5 Nonylphenol | 25 tall resin | 1 | 5 styrene | — |
| 11 | 67 | 9 Octylphenol | 13 tall oil fatty acid | 2 | 9 styrene | — |
| 12 (comparison) | 68 | — | 26 tall resin | 1 | 5 styrene | — |
| 13 (comparison) | 72 | — | 28 tall resin | — | — | — |
| 14 (comparison) | 71 | — | 28 tall resin | 1 | — | — |

TABLE 1a

| | Properties | | | | | | |
|---|---|---|---|---|---|---|---|
| | | Viscosity 50% strength | | Compatibility | | Thermal stability 50% strength in toluene mPa · s | |
| Example | Melting point °C. | in toluene mPa · s | Acid number | Mineral oil | Linseed oil | Start | 6 hours |
| 1 | 110 | 116 | 28 | 1:4 | 110 | 116 | 125 |
| 2 | 158 | 103 | 16 | 1:5 | 90 | — | — |
| 3 | 150 | 122 | 25 | 1:3 | 70 | — | — |
| 4 | 150 | 88 | 23 | 1:3 | >100 | — | — |
| 5 | 162 | 139 | 26 | 1:3 | 80 | — | — |
| 6 | 128 | 45 | 41 | 1:5 | 100 | — | — |
| 7 | 115 | 26 | 57 | 1:10 | 100 | — | — |
| 8 | 150 | 123 | 20 | 1:2 | 80 | — | — |
| 9 | 110 | 90 | 28 | 1:5 | 100 | — | — |
| 10 | 145 | 84 | 25 | 1:5 | 100 | 84 | 110 |
| 11 | 136 | 219 | 20 | 1:3 | 70 | | |
| 12(C) | 155 | 87 | 25 | 1:3 | 40 | 87 | 600 |
| 13(C) | 155 | 95 | 19 | 1:4 | 50 | 95 | 2200 |
| 14(C) | 156 | 153 | 24 | 1:2 | 40 | 153 | 6014 |

Results discussion

From Examples 2 and 3, the influence of the metal compounds on the properties of the cyclopentadiene resins obtained in which no dicarboxylic acid components were employed can be observed. Both the mineral oil and linseed oil compatibility is considerably increased by use of the metal compound, in this case magnesium oxide.

The comparison of Examples 4 and 12 C shows that the linseed oil compatability is significantly better when the resol component (b) is used. If the phenol component in the resol resin is varied by extending the alkyl chain, then not only a substantial improvement in the linseed oil compatibility, but also of the solubility in mineral oil, is obtained.

The advantages of the resins according to the invention in comparison to phenolic resin-free resins are also shown particularly in the case of the thermal stability, and thus of the storage stability. The incorporation of the phenol components produces considerably better stabilities.

The thermal stability when removing the resin melt after the end of the reaction is important when working under manufacturing conditions. The melt and solution viscosity of the resins should remain as constant as possible over a period of hours in this case in order to obtain uniform products. The addition of high boiling mineral oils after the completion of the reaction to reduce the melt viscosity and the discharge temperature is usually undesirable and unnecessary in the case of the resins according to the invention. Whereas the viscosity remains constant, within narrow limits, in the case of the resins prepared according to the invention, the comparison experiments show a considerable increase in viscosity and are thus difficult to handle under production conditions.

I claim:

1. A process for the preparation of a modified cyclopentadiene resin, wherein the mixture of (a) 55 to 80% by weight of monomeric or oligomeric cyclopentadiene and/or its alkyl-substitution products and/or its oligomers which are liquid at room temperature and which are not yet resinous are thermally polymerized with (b) 3 to 16% by weight of resols, (c) 5 to 45% by weight of non-aromatic, unsaturated monocarboxylic fatty acids or natural resin acids having 8 to 26 carbon atoms, (d) 0.5 to 10% by weight of $\alpha,\beta$-olefinic, unsaturated dicarboxylic acid units, (e) 3 to 7% by weight of other copolymerizable monomers and/or (f) 0.5 to 1.5% by weight of a metal compound from the groups IIa, IIb or IIIa of the periodic system, the sum of the components (a) to (f) always being 100% by weight, at a temperature of 230° to 290° in one stage.

2. The process as claimed in claim 1, wherein the reaction is carried out at a temperature from 255° to 285° C.

3. The process as claimed in claim 1, wherein the alkylsubtitution products of the component (a) are methylcyclopentadiene and/or dimethylcyclopentadiene.

4. The process as claimed in claim 1, wherein the component (a) is dicyclopentadiene and the component (e) is styrene the component (c) is tall oil fatty acid or colophonium, the component (d) is maleic anhydride, the component (e) is styrene and the component (f) is an oxide, hydroxide or salt of magnesium, calcium or zinc.

5. The process as claimed in claim 1, wherein the component (b) is a resol, the phenol component of which comprises at least 60% by weight of alkylphenol and the remainder of phenol.

6. The process as claimed in claim 1, wherein the resol is an alkylphenol formaldehyde compound having 1-12 carbon atoms in the alkyl group.

7. The process as claimed in claim 1, wherein the cyclopentadiene resin has a molecular weight from 600 to 5,000 and melting points between 50° and 250° C.

8. A modified cyclopentadiene resin produced by the process of claim 1.

9. A resin as claimed in claim 8, wherein the alkyl-substitution products of the component (a) are methylcyclopentadiene and/or dimethylcyclopentadiene.

10. A resin as claimed in claim 1, wherein the component (a) is dicyclopentadiene the component (c) is tall oil fatty acid or colophonium, the component (d) is maleic anhydride, the component (e) is styrene and the component (f) is an oxide, hydroxide or salt of magnesium, calcium or zinc.

11. A resin as claimed in claim 1, wherein the component (b) is a resol, the phenol component of which comprises at least 60% by weight of alkylphenol and the remainder of phenol.

12. A resin as claimed in claim 1, wherein the resol is an alkylphenol formaldehyde resin having 1-12 carbon atoms in the alkyl group.

13. A resin as claimed in claim 1, wherein the cyclopentadiene resin has a molecular weight from 600 to 5,000 and melting points between 50° and 250° C.

14. Printing inks containing the modified cyclopentadiene resins according to claim 1 as binders.

15. Printing inks as claimed in claim 14 for gravure printing.

* * * * *